April 15, 1941. G. R. G. GATES 2,238,361
BRAKE
Filed April 30, 1938 2 Sheets-Sheet 1

INVENTOR.
Geoffrey Robert Greenbergh Gates.
BY Maxwell E. Sparrow
ATTORNEY.

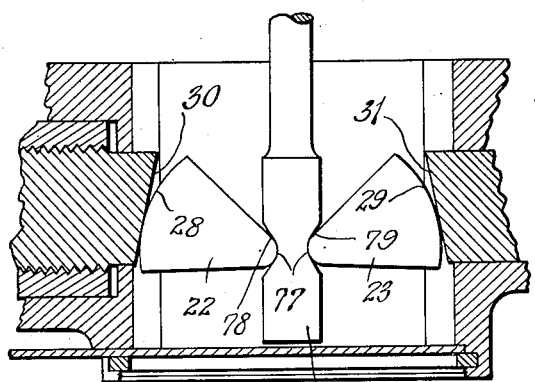
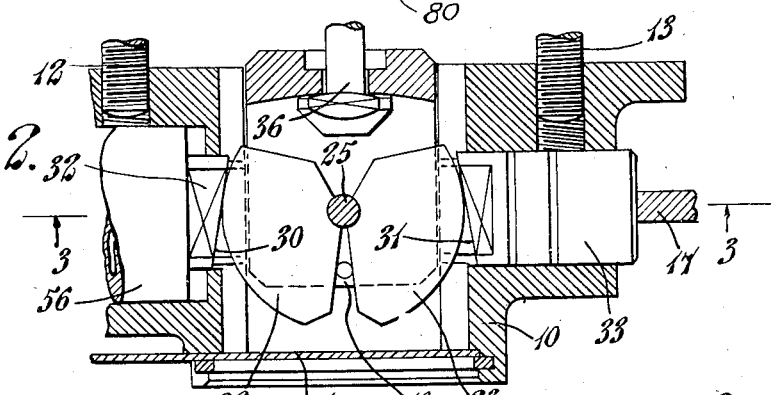
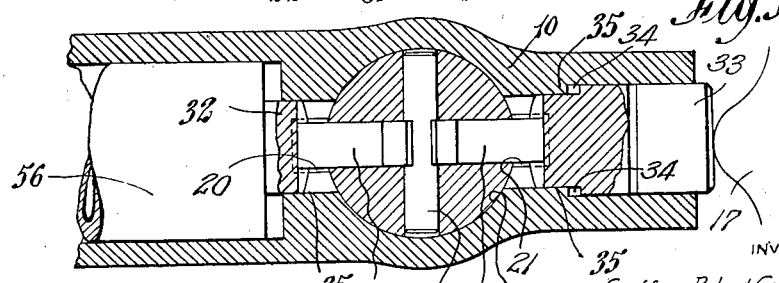

UNITED STATES PATENT OFFICE 2,238,361

BRAKE

Geoffrey Robert Greenbergh Gates, London, England, assignor to Automotive Products Company Limited, London, England Application April 30, 1938, Serial No. 205,212
In Great Britain May 19, 1937

8 Claims. (Cl. 188—78)

This invention relates to brakes, and it has for its primary object to provide an improved form of actuating mechanism which is particularly adapted for spreading apart the usual rigid arcuate brake shoes normally employed within drum brakes. It is well-known that the progressiveness and efficiency of vehicle brakes depends to a substantial extent upon the degree to which the friction in the operating mechanism is reduced, and it is, therefore, one of the aims of the present invention to provide a simple yet efficient device for this purpose.

Accordingly in a brake-applying device for spreading the ends of a pair of arcuate brake shoes by movement of an actuating member in a direction substantially at right angles to the movement of the shoe ends, the present invention is characterized by the fact that the means for transferring the movement comprises a pair of sector-shaped members which are pivotally mounted at their apices and which, at their circumferential parts, roll upon cam surfaces. Thus, in one arrangement the brake-applying device comprises in combination an actuating member which is moved in a direction substantially at right angles to the movement of the shoe ends, a cam operatively connected with each shoe, and cooperating with the surface of said cam, a sector-shaped thrust member, which at its apex is pivoted to the actuating member, and which rolls upon said cam surface. Both of the sector-shaped members may advantageously be pivotally mounted upon a single pin, each being formed with a notch at its apex adapted to bear pivotally upon said pin or an equivalent abutment member. In another arrangement the apex of each sector-shaped member is convexly rounded and engages within a cavity permitting angular movement of said sector-shaped member, while either of these two forms can be modified so that the sector-shaped members are pivoted at their apices by means of knife-edge pivots.

The actuating member is preferably bifurcated, its two limbs being bridged by an abutment member against which the two sector-shaped members bear pivotally, and which acts in compression between said sector-shaped members, to resist the shoe-spreading force. This actuating member can conveniently be mounted slidably within a bore formed in a housing, said bore being formed with a pair of longitudinal diametrically opposite grooves serving to locate the sector-shaped members.

Further, the actuating member may be operated by alternative means comprising a tension rod for connection to a mechanical rigging, and a hydraulic cylinder and piston unit adapted to be operated from a source of pressure liquid.

Further, according to the invention a brake-applying device is provided comprising in combination a housing to be secured to the usual back plate of the brake between the shoe ends to be separated, a pair of spaced, coaxial plungers slidably but non-rotatably mounted in the housing and cooperating with the respective shoes, an oblique cam surface formed on each plunger at its inner end, an actuating member mounted between the plungers in the housing so as to be slidable in a direction at right angles to the axis of said plungers, an abutment rod carried by the actuating member so as to extend at right angles to the axis of the latter and also to the axis of the plungers, a tension member for moving the actuating member towards the convergent end of the cam surfaces, and a pair of sector-shaped members each of which has a notch formed at its apex to fit pivotally against the abutment rod said sector-shaped members being disposed one on each side of said rod and being arranged so that their circumferential curved surfaces roll against the cam surfaces on the plungers, thereby moving the latter apart.

Examples of the improved brake-applying devices are shown in the accompanying diagrammatic drawings, and in these:

Figure 2 is a fragmentary section corresponding to Figure 1 but showing the parts in their operative position;

Figure 3 is a fragmentary sectional elevation taken on the line 3—3 of Figure 2;

Figure 4 is a sectional plan of a modified brake applying means.

Figure 1:
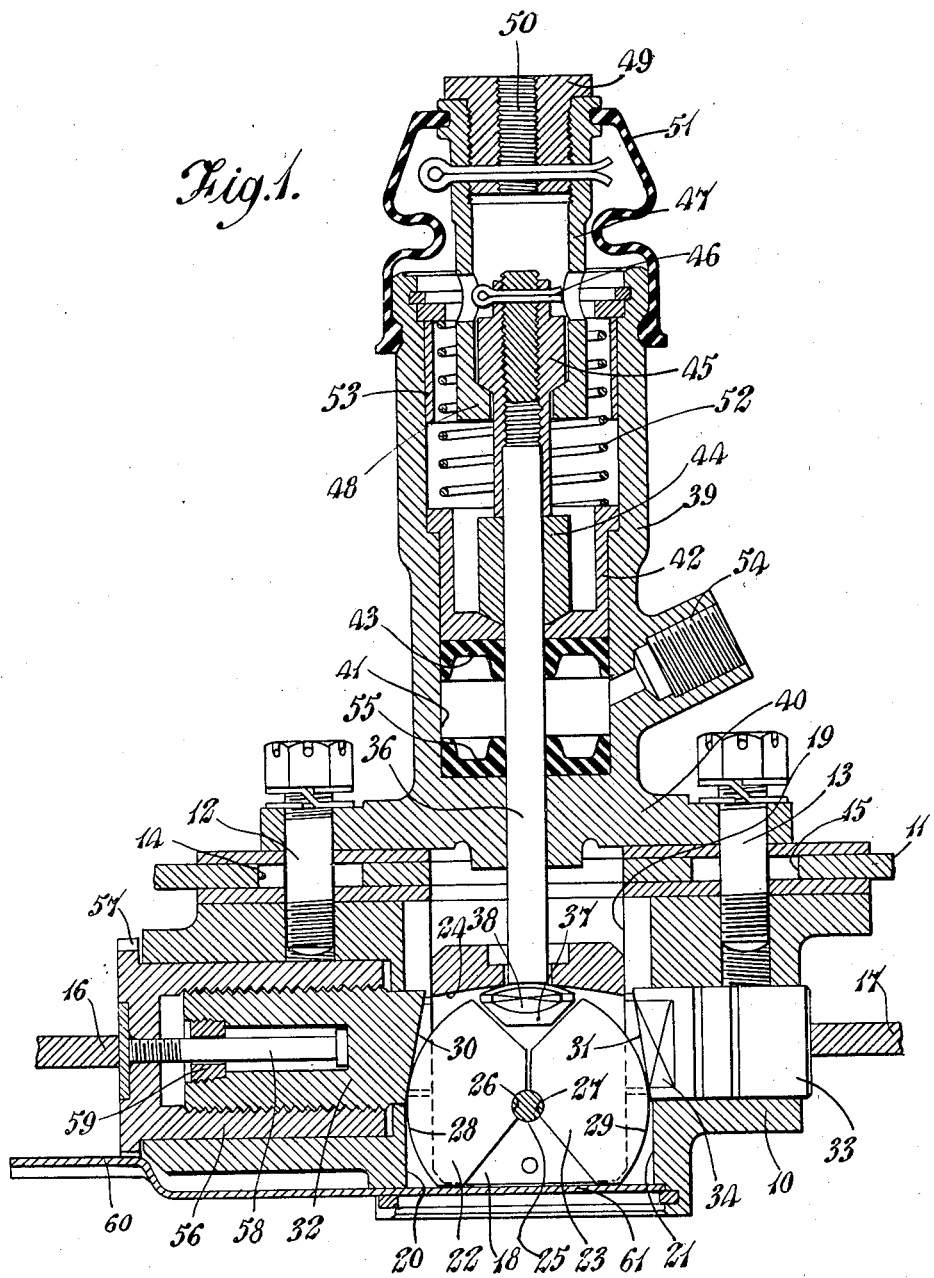
Figure 1 is a sectional plan showing the preferred form of device as adapted to be operated by alternative means.

The form of brake-applying device shown in Figures 1 to 3 comprises a housing 10 which is secured to the usual back plate 11 of the brake by means of a pair of studs 12 and 13, these being arranged to pass through slots 14 and 15 in the back plate so as to allow the applying means to float freely between the ends of the brake shoes, which latter are indicated at 16 and 17. The brake shoes are spread apart by movement of an actuating member 18 which is circular in cross-section, as will be seen in Figure 3, and is slidable within a bore 19 formed transversely within the housing 10, said bore having a pair of diametrically opposite longitudinal grooves 20 and 21 for the accommodation of two sector-shaped members 22 and 23. These are fitted within a deep groove 24 which is cut in the actuating member 18 and which renders it bifurcated in form. The two limbs of the actuating member are bridged by an abutment pin 25, and this is engaged by curved notches 26 and 27 formed at the apices of the sector-shaped members 22 and 23 respectively so as to constitute a pivotal bearing of relatively small radius. The outer curved circumferential surfaces 28 and 29 of the sector-shaped members 22 and 23 cooperate with oblique cam surfaces 30 and 31 respectively, formed upon a pair of plunger members 32 and 33 slidably mounted in the housing 10. For the main part of their length the plunger members 32 and 33 are circular in cross-section, but at their inner ends they are formed with flats 34 which engage corresponding projecting parts 35 formed in the housing 10 (see Figure 3) so as to prevent rotation of said plunger members but at the same time permit them to slide freely.

For moving the actuating member 18 a tension rod 36 engages said member by means of a head 37 which is formed with flats 38 in order to prevent the rod 36 from twisting.

Provision is made for applying a tension to the rod 36, either mechanically through the usual rods of a brake rigging, or hydraulically, and for this purpose a cylinder unit 39 is fitted to the exterior of the back plate 11 by means of a flange 40, and is bored at 41 so as to constitute a hydraulic cylinder. This contains a slidable piston 42 which is hollow and which cooperates with an annular rubber cup 43 to prevent leakage of fluid, the centre part of said piston being adapted to bear against a nut 45 through the medium of a collar 44. The nut 45 is screw-threaded on to the rod 36, its adjustment being locked by a split pin 46, and this nut also serves as the means whereby the force from the mechanical rigging is transferred to the rod 36. For this purpose a socket member 47 surrounds the nut 45 and has an end flange 48 arranged to bear axially against the nut, the other end of the socket member 47 being fitted with a plug 49 which is internally screw-threaded at 50 whereby it is connected with the mechanical brake rigging (not shown). A rubber boot 51 prevents dirt and other foreign matter from entering the working parts of the device. The piston 42 is normally returned to its inoperative position by a coiled compression spring 52, and excessive movement of said piston is prevented by a tubular stop 53 disposed within the cylinder unit 39. Since the rod 36 slides freely within the piston 42 and the collar 44 these parts are not affected when the brake is applied mechanically, and in a similar way the brake rigging is unaffected when the hydraulic means is used, the nut 45 merely sliding further into the socket member 47. For hydraulic actuation pressure liquid is supplied through a connection 54, and said liquid is prevented from leaking into the brake by a rubber packing cup 55.

The exterior of the plunger member 32 is screw-threaded and engages with a plunger sleeve 56 so as to provide a device whereby the clearance of the brake shoes can be readily adjusted. At its outer end the sleeve 56 is formed with a toothed wheel or head 57 which when rotated brings about the lengthening of the members 32 and 56. A stem 58 is fitted to the sleeve 56 and cooperates with a ring 59 screw-threaded into the plunger 32 in order to prevent the adjustment from being taken too far. The setting of the sleeve 56 is maintained by a spring finger 60 which engages the teeth of the wheel 57, and which at its other end has a circular portion 61 serving to close the bore 19 in the housing 10.

The operation of the applying means will be readily apparent. As the rod 36 is moved the sector-shaped members 22 and 23 pivot upon the abutment pin 25 and their outer circumferential surfaces 28 and 29 roll upon the cam surfaces 30 and 31, thus progressively moving the plungers 32 and 33 outwardly so that the parts tend to take up the positions shown in Figure 2, the same time applying the shoes to the brake drum (not shown). This arrangement provides very little friction as the angular movement of the sector-shaped members 22 and 23 is extremely small owing to their large radius of action. Moreover, this large radius ensures that there will always be an appreciable area of contact between the sector-shaped members and the cam surfaces, thus considerably reducing the possibility of indentation of the surfaces.

A somewhat modified arrangement is shown in Figure 4, but in this case the apex of each of the sector-shaped members 22 and 23 is convexly curved as indicated at 77 and is adapted to engage pivotally within a corresponding recess 78 or 79 formed in an actuating member which is indicated at 80. This again provides small frictional losses as the angular movement of the sector-shaped members is small, while the curved surfaces 28 and 29 which cooperate with the cam surfaces 30 and 31 have a relatively large radius.

Moreover the actuating member 80 is merely subject to compression between the sector shaped members 22 and 23 on account of the shoe spreading force thus enable said actuating member 80 to have adequate strength despite its relatively small size.

The improved brake-applying means can be used with various forms of drum brakes, such for example as those having a simple pair of leading and trailing shoes, and those in which a pair of shoes both act in the leading sense in one or both directions of rotation of the drum.

What I claim is:

1. A brake-applying device for spreading the ends of a pair of brake shoes, comprising in combination an actuating member movable in a direction substantially at right angles to the movement of the shoe ends, an inclined cam surface operatively connected with each shoe, a transverse pin carried by the actuating member and a pair of sector-shaped thrust-members, both of which at their apices are pivotally mounted on the said pin and rollable with their circumferential parts upon the corresponding cam surfaces.

2. A brake-applying device for spreading the ends of a pair of brake shoes, comprising in combination an actuating member movable in a direction substantially at right angles to the movement of the shoe ends, a cam operatively connected with each shoe, a pin carried by the actuating member, and a pair of sector-shaped thrust-members, each of which is notched at its apex to engage pivotally around said pin and rollable upon the corresponding cam surface.

3. A brake-applying device for spreading a pair of arcuate brake shoes, constituting an actuated element into contact with a brake drum, comprising in combination an actuating element which is moved in a direction substantially at right angles to the direction of movement of the ends of the actuated element, a pair of cam surfaces operatively connected with one of said elements and inclined to one another and to the direction of movement of the ends of the actuated element, the other of said elements having a pair of cavities and a pair of oppositely disposed sector-shaped thrust-members, each of which is convexly rounded at its apex so as to engage pivotally in the corresponding cavity in the one element and to roll with its circumferential part on the corresponding inclined cam surface on the other element.

4. A brake-applying device for spreading the ends of a pair of brake shoes, comprising in combination a housing, a pair of plungers slidable within the housing and acting on the ends of the brake shoes, a bifurcated actuating member slidably movable within the housing in a direction substantially at right angles to the movement of the plungers, an abutment pin bridging the limbs of the actuating member, a cam surface on each plunger, and a pair of sector-shaped thrust-members each of which rolls with its circumferential part upon the corresponding cam surface, a part-cylindrical concave bearing surface subtending an angle of approximately 120° at its axis being formed at the apex of each sector-shaped member, to bear against opposite sides of the said abutment pin.

5. A brake-applying device for spreading the ends of a pair of brake shoes, comprising in combination a housing, a bore in the housing extending in a direction substantially at right angles to the movement of the brake shoe ends, an actuating member slidable within the bore, an inclined cam surface associated with each brake shoe end, a pair of sector-shaped thrust-members pivotally mounted at their apices on the actuating member and having their circumferential parts in rolling contact with the corresponding cam surfaces, and a pair of longitudinal, diametrically opposite grooves formed in the bore serving to locate the sector-shaped members.

6. A brake-applying device for spreading a pair of arcuate shoes, constituting an actuated element into contact with a brake drum, comprising in combination an actuating element movable in a direction substantially at right angles to the direction of movement of the ends of the actuated element, a pair of cam surfaces operatively connected with one of said elements and inclined to one another and to the direction of movement of the actuating element, a pair of oppositely disposed sector-shaped thrust-members in pivotal engagement at their apices with the other of the said elements and in rolling contact at their circumferential parts with the said cam surfaces, a mechanically actuated rigging, a liquid pressure source, a hydraulic cylinder and piston unit in communication with said source, a tension rod associated with the actuating element and extending coaxially through the hydraulic cylinder to connect with the said mechanical rigging so that the sector-shaped members may be actuated either mechanically or hydraulically.

7. A brake-applying device comprising in combination a housing secured to the usual back plate of the brake between the shoe ends to be separated so as to be slidable in the direction of separation of said shoes, a pair of spaced, coaxial plungers slidably but non-rotatably mounted in the housing and cooperating with the respective shoes, an oblique cam surface formed on each plunger at its inner end, an actuating member mounted between the plungers in the housing so as to be slidable in a direction substantially at right angles to the axis of said plungers, an abutment pin carried by the actuating member so as to extend at right angles to the axis of the latter and also to the axis of the plungers, a tension member for moving the actuating member towards the convergent end of the cam surfaces, and a pair of sector-shaped members each of which having a notch formed at its apex to fit pivotally against the abutment pin, said sector-shaped members being disposed one on each side of said pin and being arranged so that their circumferential curved surfaces roll against the cam surfaces on the plungers, thereby moving the latter apart.

8. A brake-applying device for spreading the ends of a pair of brake shoes, comprising in combination a housing, a pair of plungers slidable within said housing and acting on the ends of said brake shoes, a bifurcated actuating member slidably movable within said housing in a direction substantially at right angles to the movement of said plungers, a cylindrical abutment member bridging the limbs of the actuating member, a cam surface on each of said plungers, and a pair of sector-shaped thrust-members rolling with their circumferential parts upon said cam surfaces, respectively, said thrust-members being grooved at their apices to commonly engage with said abutment member on opposite sides thereof, so that the angle subtended at the axis of said abutment member by the edges of each groove is substantially less than 180°, said abutment member thus acting in compression to resist the shoe-spreading force, and at the same time permitting a predetermined angular movement of the sector-shaped members.

GEOFFREY ROBERT
GREENBERGH GATES.